Patented Aug. 6, 1940

2,210,167

UNITED STATES PATENT OFFICE 2,210,167

PROTECTIVE COATING

Paul W. Felt, Minneapolis, Minn., assignor to Brown & Bigelow, St. Paul, Minn., a corporation of Minnesota No Drawing. Application December 2, 1937, Serial No. 177,789

8 Claims. (Cl. 91—68)

My invention relates to an improvement in protective coatings wherein it is desired to provide a coating particularly adapted for use in covering printing or designs formed upon the surface of cellulose acetate material, or as a polish.

During the past few years it has been common practice to form articles such as pencil barrels and the like, from cellulose acetate material. Because of the common practice of printing upon the barrels of pencils and the like, many attempts have been made to provide a protective coating for the printing which will prevent the printing or the designs formed on the barrel from being rubbed off.

It is of course, possible to emboss printing or designs on barrels of this type, but this process is costly and slow commercially. Attempts have accordingly been made to coat the pencil with a coating of lacquer or the like. However, nitrocellulose lacquer has a greater affinity for the plasticizer used in the formation of the cellulose acetate articles, than has the body of the article itself. Accordingly, when the cellulose acetate body is coated with nitrocellulose lacquer, a migration of the plasticizer from the pencil body to the lacquer takes place. This action is greatly hastened by high temperatures and humidity. Accordingly, when pencils having bodies formed of cellulose acetate and coated with nitrocellulose lacquer are carried in the pocket on a hot day, the plasticizer soon migrates into the lacquer, softening the lacquer and making the lacquer film extremely tacky.

Attempts have also been made to coat cellulose acetate bodies with resinous lacquers, but it has been found that while many of such lacquers do not have the affinity for the plasticizer of nitrocellulose lacquer, these materials do act to draw the plasticizer from the cellulose acetate body, causing this plasticizer to be interposed between the coating and the body and causing the coating to lose its adhesive qualities. In such cases, the coating will peel off or slip off from the article body.

The object of the present invention is to provide a protective covering by coating the cellulose acetate body of the article with cellulose acetate. Obviously, such material when applied will form an integral part of the body, but will act as a transparent film through which the printing or applied design may be observed. The success of my invention relies upon the selection of a suitable combination of solvent and diluents which will cut the raw cellulose acetate, but will not attack the cellulose acetate body to be coated.

It is a well known fact that cellulose acetate lacquers comprised of such solvents as acetone, methyl ethyl ketone, ethyl lactate, or any other of the active cellulose acetate solvents, will cause a wrinkling or distortion of the surface of a molded cellulose acetate article. However, these same solvents in combination with the proper type of diluent can be adjusted so as to still be solvents for raw cellulose acetate, but will not attack the surface of the molded cellulose acetate article.

The alcohols and the aromatic hydrocarbons are the most popular diluents in cellulose acetate lacquers. The type of raw cellulose acetate used determines which of these two diluents shall be used. More alcohol or less toluol (being representative of aromatic hydrocarbons) may be used as a diluent in a solution containing low acetyl content cellulose acetate, than in a solution with either medium or high acetyl content cellulose acetate. The medium acetyl type will, however, have the greatest tolerance for a mixture of 50% alcohol and 50% toluol.

It has been found that not a sufficient amount of these two diluents can be added to the cellulose acetate lacquer to tone down the active solvents so that they will not attack the surface of the cellulose acetate molded article, but I have now discovered that in the presence of these two diluents, either separately or in combination with one another, depending upon the raw cellulose acetate, other diluents, which when used alone would be tolerated only in very small percentages in the lacquer, can be added in large enough quantities to tone down the most active solvents of cellulose acetate. Among these diluents I list the following, but do not wish to limit myself to these alone as there are no doubt others in the same groups which will give equally good results. First there are the esters such as butyl acetate or isopropyl acetate. Then there are the ketones such as dipropyl ketone or methyl isobutyl ketone. Also, the alcohol-ethers, such as ethylene glycol monoethyl ether, or ethylene glycol monobutyl ether. There are also the lactates, such as butyl lactate. As will be noted, all of these mentioned diluents are either non-solvents or have only a slight solvent action on cellulose acetate, and if used alone, would not be tolerated to any extent in a cellulose acetate lacquer; but, in combination with alcohol, aromatic hydrocarbons, or mixtures of both as much as 50% may be added without causing the cellulose acetate to come out. This combination of diluents may be used with any solvent combination, the weaker the active solvent, the smaller the percentage of diluent required.

As in the case of diluents previously described, there are a great number of plasticizers which may be used for my purpose. Accordingly, it is not the purpose of this invention to limit the scope of the patent to one specific type of plasticizer. Also, just as in the case of diluents, certain materials are advantageous. It is believed preferable, however, to use a plasticizer which is not a solvent for cellulose acetate, but which is compatible therewith. For example, dibutyl phthalate or tricresyl phosphate may be used. There are also a great number of plasticizers produced commercially under various trade names which will provide good results. For some uses it is not even necessary to incorporate a plasticizer in the lacquer, as sufficient plasticizer is obtained by transmission from the article upon which the film is applied.

It is not necessary to limit the present invention to the use of straight cellulose acetate lacquers since there are various natural and synthetic resins compatible with cellulose acetate which might be substituted for a part of the acetate without materially changing the properties of the lacquer film. Among the natural resins suitable for use are gum accroid and gum guaiac. Because of their color the uses of these resins are limited in coating lacquers. Among the synthetic resins which may be used may be found a great number on the market under various trade names which in combination with cellulose acetate produce some very nice finishes. These resins may produce either a color or colorless coating according to the resin used.

The following formulas disclose in general the formula for my coating:

| | Parts |
|---|---|
| Active solvent | 40–80 |
| Diluent | 15–50 |
| Plasticizer | 0– 5 |
| Cellulose acetate | 1–15 |

A second general formula may be as follows:

| | | Parts |
|---|---|---|
| Active solvent | parts | 40– 80 |
| Diluent | do | 15– 50 |
| Dibutyl phthalate | do | 0– 5 |
| Cellulose acetate | do | 1– 15 |
| Resin (synthetic or natural) per cent of the total solids | | 0–100 |

As specific examples of coatings which could be produced under these general formulas, the following more specific formulas are quoted. It will be understood that other diluents, active solvents, and plasticizers may be used in place of the one specifically mentioned, but those cited in the formula are believed extremely suitable for the purpose.

I.

| | | Parts |
|---|---|---|
| (Active solvent) | Ethyl acetate | 50 |
| Diluents | Ethyl alcohol | 5 |
| | Butyl acetate | 35 |
| Solids | Cellulose acetate | 10 |

II.

| | | Parts |
|---|---|---|
| (Active solvents) | Ethyl acetate | 40 |
| Diluents | Ethyl alcohol | 10 |
| | Butyl acetate | 40 |
| Solids | Cellulose acetate | 7 |
| | Resin | 3 |

III.

| | | Parts |
|---|---|---|
| (Active solvents) | Ethyl acetate | 50 |
| Diluents | Ethyl alcohol | 5 |
| | Butyl acetate | 32 |
| Plasticizer | Tributyl phosphate | 3 |
| | Cellulose acetate | 10 |

IV.

| | | Parts |
|---|---|---|
| (Active solvents) | Ethyl acetate | 40 |
| Diluents | Ethyl alcohol | 7 |
| | Butyl acetate | 35 |
| Solids | Resin | 3 |
| | Cellulose acetate | 7 |
| (Plasticizer) | Tributyl phosphate | 3 |

Printing or designs placed upon bodies of cellulose acetate may be covered by coatings in accordance with the foregoing formulas in such a manner that the printing will be embedded within the body of the article as the coating forms in reality an integral part of the body. Pencil barrels, for example, formed of cellulose acetate can be printed in the usual manner, and this printing protected by embedding the same within the body where it is visible through the transparent film, but where it is not accessible and cannot be rubbed off.

I have found a solvent when used in combination with raw cellulose acetate with or without diluents forms a lacquer which will not attack the articles to be coated enough to cause any noticeable surface distortion or wrinkling. This solvent is ethylene glycol mono-ethyl-ether mono-acetate, which is better known as cellosolve acetate or betaethoxyethyl acetate, and has the formula $C_2H_5OCH_2CH_2CO_2CH_3$. This solvent has a rather high boiling point range (145° to 166° C.) and a vapor pressure of about 3 mm. at 30° C. This feature is desirable as it gives the lacquer good flowing properties and practically eliminates all chance for blushing since water is but slightly soluble in it. Its evaporation rate is not so low that the setting of the lacquer film is unduly retarded. Cellosolve acetate is also a good solvent for resins and has the property of imparting a high gloss to lacquer films. This solvent may be used with any viscosity cellulose acetate, but for application by spray or by dipping as low a viscosity as possible is desired.

Cellosolve acetate may be used merely with the cellulose acetate, but for ordinary purposes it is common practice to use a diluent or a plasticizer or both in the formula. The formula may or may not contain a synthetic or natural resin.

As examples of the use of cellosolve acetate, in general, the following formula may be used:

| | | Parts |
|---|---|---|
| Cellosolve acetate | parts | 80–100 |
| Diluent | do | 0– 15 |
| Plasticizer | do | 0– 5 |
| Cellulose acetate | do | 1– 15 |
| Resin (synthetic or natural) % of the total solids | | 0–100 |

The following specific examples are typical of the use of cellosolve acetate. It will be understood that other diluents and plasticizers may be used in the place of those mentioned:

| | Parts |
|---|---|
| Cellosolve acetate | 100 |
| Cellulose acetate | 7 |

| | Parts |
|---|---|
| Cellosolve acetate | 95 |
| Butyl acetate | 5 |
| Cellulose acetate | 7 |

| | |
|---|---|
| Cellosolve acetate | 92 |
| Butyl acetate | 5 |
| Dibutyl phthalate | 3 |
| Cellulose acetate | 7 |
| Cellosolve acetate | 97 |
| Dibutyl phthalate | 3 |
| Cellulose acetate | 7 |
| Cellosolve acetate | 100 |
| Cellulose acetate | 7 |
| Resin | 7 |
| Cellosolve acetate | 95 |
| Butyl acetate | 5 |
| Cellulose acetate | 7 |
| Resin | 7 |
| Cellosolve acetate | 92 |
| Butyl acetate | 5 |
| Dibutyl phthalate | 3 |
| Cellulose acetate | 7 |
| Resin | 7 |
| Cellosolve acetate | 97 |
| Dibutyl phthalate | 3 |
| Cellulose acetate | 7 |
| Resin | 7 |

In accordance with the patent statutes I have described the principles of construction of my coating, and while I have endeavored to set forth the best embodiment thereof, I desire to have it understood that obvious changes may be made within the scope of the following claims without departing from the spirit of my invention.

I claim:

1. An article of manufacture comprising substantially a molded body of cellulose acetate, having a coating thereupon, the said coating being deposited from a mixture of ethyl acetate 40–50 parts; ethyl alcohol 5–10 parts; butyl alcohol, 32–40 parts; plasticizer, 0–3 parts; and cellulose acetate, 7–10 parts.

2. An article of manufacture comprising substantially a molded body of cellulose acetate having a coating thereupon, the said coating being deposited from a mixture of ethyl acetate, 40–50 parts; ethyl alcohol 5–10 parts; butyl alcohol, 32–40 parts; tributyl phosphate, 0–3 parts, and cellulose acetate 7–10 parts.

3. An article of manufacture comprising substantially a molded body of cellulose acetate having a coating thereupon, the coating being deposited from a mixture of active solvent for cellulose acetate, 40 to 80 parts; plasticizer, 0 to 5 parts; cellulose acetate, 1 to 15 parts; and a diluent, 15 to 50 parts; said diluent comprising alcohol and another diluent material substantially non-solvent of cellulose acetate.

4. An article of manufacture comprising substantially a molded body of cellulose acetate having a coating thereupon, the coating being deposited from a mixture of active solvent for cellulose acetate, 40 to 80 parts; plasticizer, 0 to 5 parts; cellulose acetate, 1 to 15 parts; and a diluent, 15 to 50 parts; said diluent comprising an aromatic hydrocarbon and another diluent material substantially non-solvent of cellulose acetate.

5. An article of manufacture comprising substantially a molded body of cellulose acetate having a coating thereupon, the coating being deposited from a mixture of active solvent for cellulose acetate, 40 to 80 parts; plasticizer, 0 to 5 parts; cellulose acetate, 1 to 15 parts; and a diluent, 15 to 50 parts; said diluent comprising a combination of alcohol with an aromatic hydrocarbon and another diluent material substantially non-solvent of cellulose acetate.

6. An article of manufacture comprising substantially a molded body of cellulose acetate having a coating thereupon, the coating being deposited from a mixture of active solvent for cellulose acetate, 40 to 80 parts; plasticizer, 0 to 5 parts; cellulose acetate, 1 to 15 parts; resin, from 0 part to an amount equal to the total solids; and diluent, 15 to 50 parts; said diluent comprising in combination, alcohol and another diluent material substantially non-solvent of cellulose acetate.

7. An article of manufacture comprising substantially a molded body of cellulose acetate having a coating thereupon, the coating being deposited from a mixture of active solvent for cellulose acetate, 40 to 80 parts; plasticizer, 0 to 5 parts; cellulose acetate, 1 to 15 parts; resin, from 0 part to an amount equal to the total solids, and diluent, 15 to 50 parts; said diluent comprising in combination, alcohol, an aromatic hydrocarbon, and another diluent material substantially non-solvent of cellulose acetate.

8. An article of manufacture comprising substantially a molded body of cellulose acetate having a coating thereupon, the coating being deposited from a mixture of active solvent for cellulose acetate, 40 to 80 parts; plasticizer, 0 to 5 parts; cellulose acetate, 1 to 15 parts; resin, from 0 part to an amount equal to the total solids, and diluent, 15 to 50 parts; said diluent comprising in combination, an aromatic hydrocarbon, and another diluent material substantially non-solvent of cellulose acetate.

PAUL W. FELT.